United States Patent [19]

Sakakibara et al.

[11] Patent Number: 4,919,645
[45] Date of Patent: Apr. 24, 1990

[54] ENDLESS TRANSMISSION BELT

[75] Inventors: Shiro Sakakibara; Yoshinori Miyaishi, both of Aichi; Yoshiaki Kano, Gifu, all of Japan

[73] Assignee: Aisin-Aw Kabushiki Kaisha, Japan

[21] Appl. No.: 287,115

[22] Filed: Dec. 21, 1988

[30] Foreign Application Priority Data

Dec. 29, 1987 [JP] Japan ................... 62-335987

[51] Int. Cl.⁵ .............................. F16G 1/24
[52] U.S. Cl. ................................. 474/245
[58] Field of Search ............... 474/245, 244, 242, 201, 474/214–217

[56] References Cited

U.S. PATENT DOCUMENTS

| 4,512,754 | 4/1985 | Cole et al. ...................... 474/245 |
| 4,708,701 | 11/1987 | Cole, Jr. ........................... 474/245 |
| 4,737,137 | 4/1988 | Miyaishi ........................... 474/245 |
| 4,753,627 | 6/1988 | Kawamoto ........................ 474/18 |

Primary Examiner—Thuy M. Bui
Attorney, Agent, or Firm—Lorusso & Loud

[57] ABSTRACT

An endless transmission belt for use in continuously variable transmissions of the chain type with a number of link plates interconnected in an endless manner. The belt has blocks arranged paired pins arranged longitudinally around its length and engaging with the blocks, link plates arranged transverse to the length of the belt and engaging the pins, and pin engagement grooves formed in the blocks and engaging the pins, wherein one or a plurality of sets of the link plates are interconnected by mutual pins in an endless manner. The pin engagement grooves are formed with recesses capable of compensating for the canting of the paired pins as they rotate about their longitudinal axes in passage around a pulley. Consequently, chattering movement of the blocks is reduced and, in addition, the amount by which the blocks slip in the circumferential direction when the belt is in engagement with the pulleys is reduced, thereby making the end faces of the pulleys and the blocks less vulnerable to wear, while reducing torque loss and thus improving transmission efficiency.

8 Claims, 8 Drawing Sheets

Fig. 6
Fig. 7
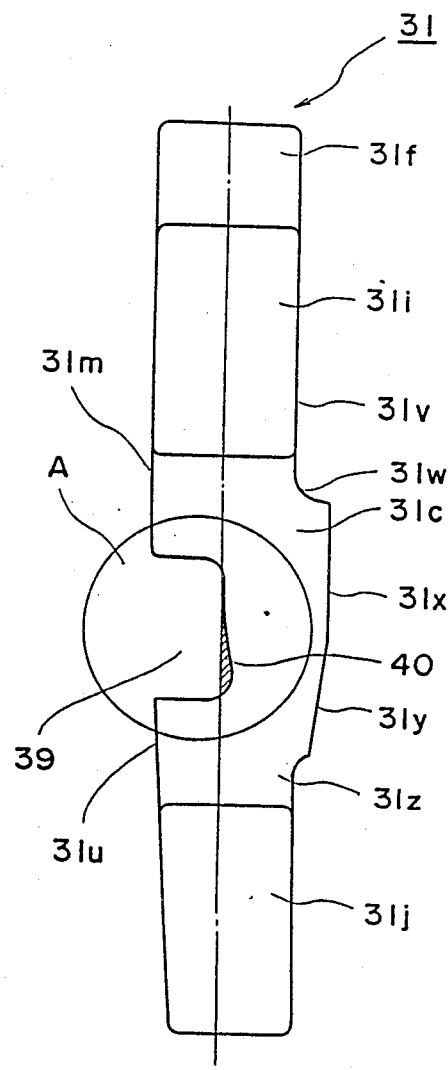
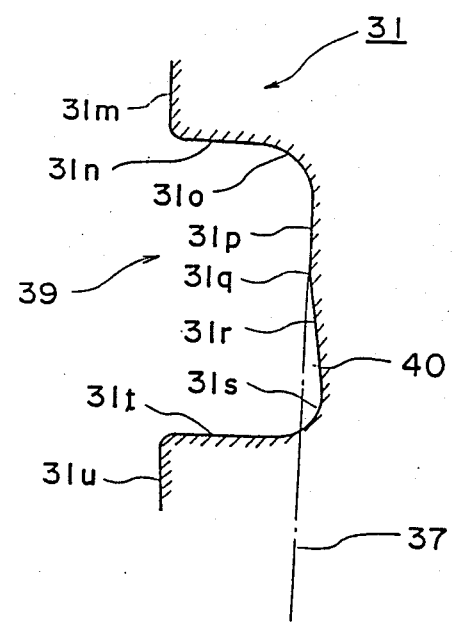

4,919,645

ENDLESS TRANSMISSION BELT

BACKGROUND OF THE INVENTION

The present invention relates to endless transmission belts and, in particular, to endless belts for use in continuously variable transmissions of the chain type in which a number of link plates are interconnected in an endless manner.

FIGS. 1 (a) and (b) are views showing the overall structure of parts of the conventional transmission belt, FIG. 1 (a) showing a portion in a straight run of the belt, i.e., in a portion which is not in engagement with the pulleys, and FIG. 1 (b) showing a bent portion of the belt, i.e., in a portion which is in engagement with a pulley. FIG. 2 is a side view showing the state of blocks and pins in contact with a driving pulley during operation of the belt, and FIG. 3 is a sectional view showing the state of the belt when engaged with a pulley. FIG. 2 shows the nontorque transmitting region a and the torque transmitting region b when rotation is counterclockwise as indicated by arrow R.

As shown in FIGS. 1 and 2, a first block 1 and a second block 2 each have a groove 4 engaging a pin 3 and having a generally rectangular shape partially defined by a flat side surfaces 1a or 2a. In order to allow the pin 3 to can't whereby the inner side of a pin projects by an amount Δ beyond the space normally occupied by the pin, as when the belt passes around a pulley, gaps corresponding to (2×Δ) must be provided between the pins 3 and the blocks 1 and 2 when these members are present in a straight portion of the belt. The dimension of the gap has to be determined using an amount Δ by which the pin projects when the belt is bent at the minimum rotational radius. As a result, if the rotational radius of the belt is larger than the minimum rotational radius, a gap X may occur in the bent portion of the belt even in the non-torque transmitting region a, as shown in FIG. 2. In FIGS. 1 and 2, reference numerals 5 and 5' denote links engaging with the pins 3 and 3', and reference numeral 6 denotes a portion of contact between pins 3 and 3' and the grooves 4 and 4' of the blacks.

The occurrence of such gaps X leads to the following problems:

(1) The blocks 1 and 2 may slip a distance corresponding to the gaps X when the belt is in engagement with pulleys 7 (see FIG. 3), thereby making the surfaces of contact between the pulleys 7 and the blocks 1 and 2 more vulnerable to wear, and causing a reduction in transmission efficiency.

(2) When the belt is in engagement with the pulleys 7, since the blocks 1' and 2' are inclined relative to the axis 8 of the pulleys 7, which inclination leads to abrasion of the surfaces of the pulleys 7. In FIG. 3, reference numerals 3' and 9 denote pins and sets of link plates, respectively.

(3) In a straight portion of the belt, string vibration of the belt causes an increase in the chattering movement of the blocks 1 and 2, resulting in the generation of more noise.

SUMMARY OF THE INVENTION

An object of the present invention is to overcome the above-stated problems, and to provide an endless transmission belt which is capable of achieving smooth engagement between pins and blocks, and of restraining chattering movement of the blocks.

In order to achieve the above-stated object, according to the present invention, an endless transmission belt is provided in which: blocks are arranged around the length of the belt; pins are arranged around the length of the belt in engagement with the blocks; link plates are arranged in parallel across the width of the belt and in engagement with the pins; and pin engagement grooves are formed in the blocks for containing the pins. Plural sets of the link plates are interconnected by mutual pins in an endless manner, the pin engagement grooves being formed with recesses capable of compensating for the canting (tilting) of the pins during passage around a pulley.

With the above-stated arrangement of the endless transmission belt in accordance with the present invention, (1) Since the pin engagement grooves of the blocks are formed with recesses which compensate for the canting of the pins during passage around a pulley, the part of the blocks that defines the pin engagement grooves can possess the maximum possible thickness which enables the gaps between the pins and the blocks to be minimized. Consequently, chattering movement of the blocks can be restrained.

(2) When the belt is in engagement with the pulleys, it is possible to reduce the amount by which the blocks slip in the circumferential direction. Consequently, the end faces of the pulleys and the blocks are less vulnerable to wear, thereby improving durability. In addition, toque loss is reduced, thereby improving transmission efficiency.

(3) When the belt is in engagement with the pulleys, the blocks incline relative to the axis of the pulleys at reduced angles. Consequently, it is possible to avoid the risk that damage such as abrasion may occur on the surfaces of the pulleys, thereby improving the durability of the pulleys.

(4) In a straight portion of the belt, the blocks can be restrained from any chattering movement even if the belt undergoes string vibration, thereby reducing noise.

BRIEF DESCRIPTION OF THE DRAWINGS

FIG. 6 is a side view of a block of the belt shown in FIG. 4;

FIG. 7 is an enlarged view of the part A shown in Fig. 6;

DESCRIPTION OF THE PREFERRED EMBODIMENTS

Embodiments of the present invention will now be described in detail with reference to the drawings.

First, the structure of an endless transmission belt in accordance with the present invention will be described referring to FIGS. 4 through 7.

Figure 4:
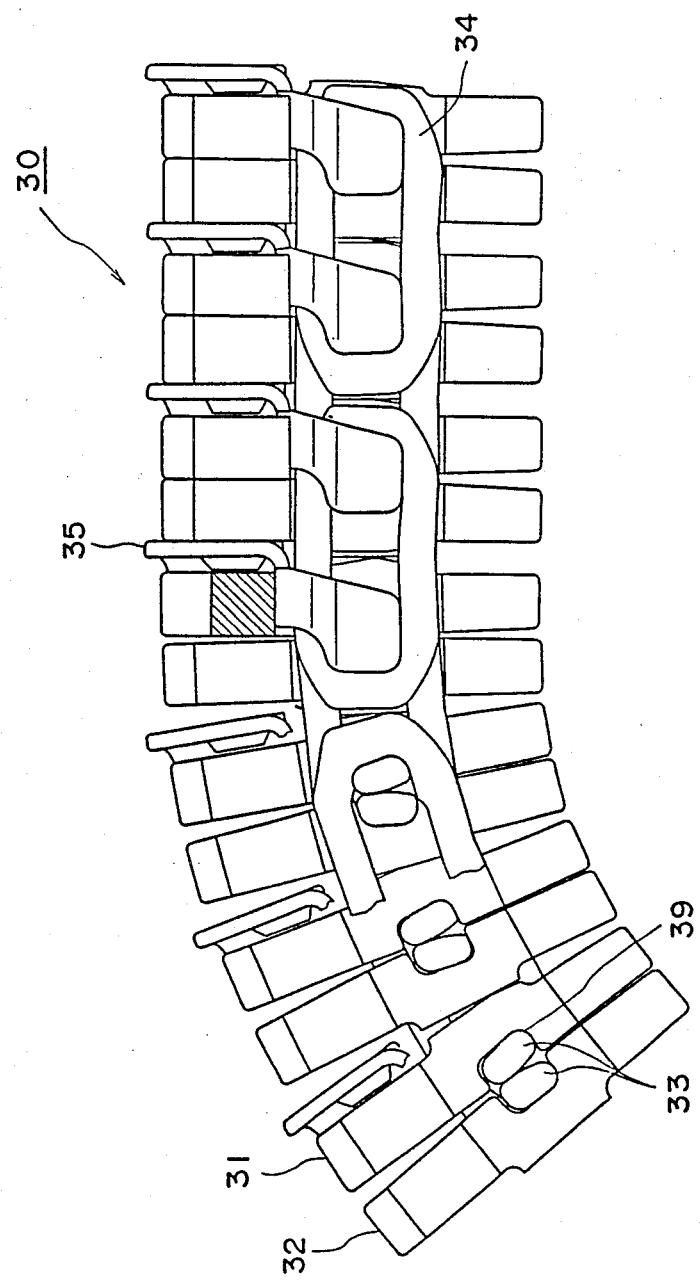
FIG. 4 is a partially cutaway side view of an endless transmission belt, showing an embodiment of the present invention.
Figure 5:
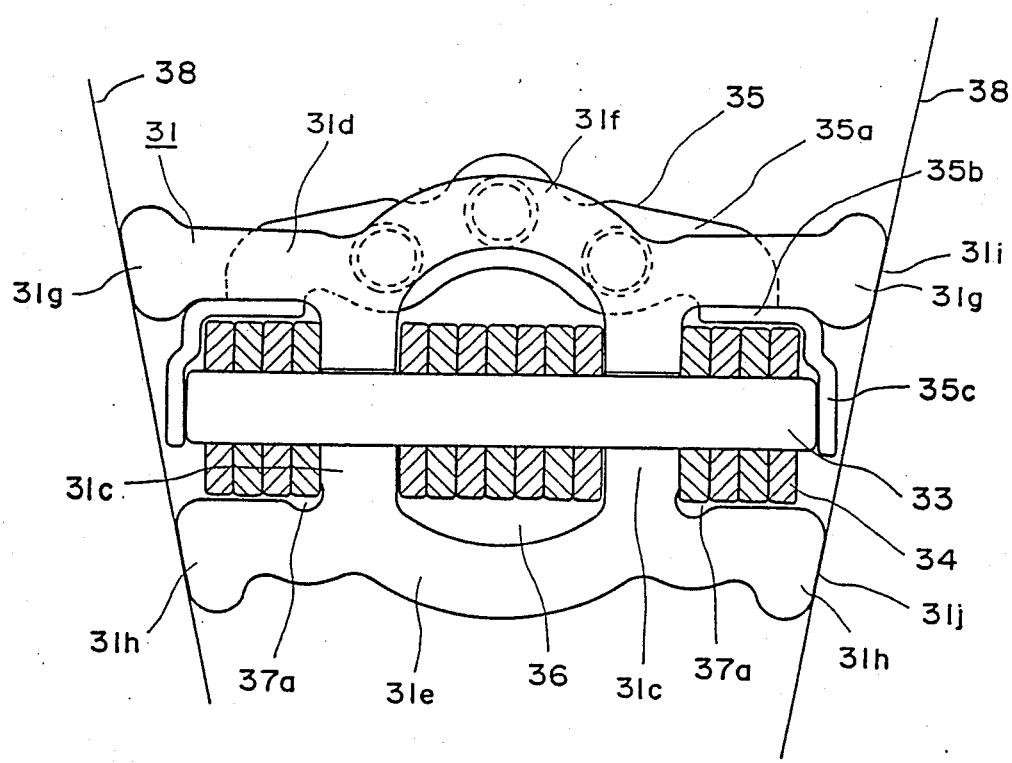
FIG. 5 is a view of a section through the endless transmission belt shown in FIG. 4.

As shown in FIGS. 4 and 5, an endless transmission belt 30 has first block members 31, paired with second block members 32, link plates 34 linking adjacent pairs of block members 31 and 32 and pins 33 engaging the link plates 34. Retainers 35 determine the position of the first and second block members 31 and 32 and sets of the link plates 34, while preventing the string vibration of straight portions of the belt as well as preventing displacement of the pins 33. Each retainer 35 has a horizontally symmetrical configuration including vertical portions 35a formed on either side of a central bridge portion, horizontal portions 35b continuous with each vertical portion 35a, and suspended portions 35c continuing with the horizontal portions 35b.

The structure of these components will be described below.

Figure 1A:
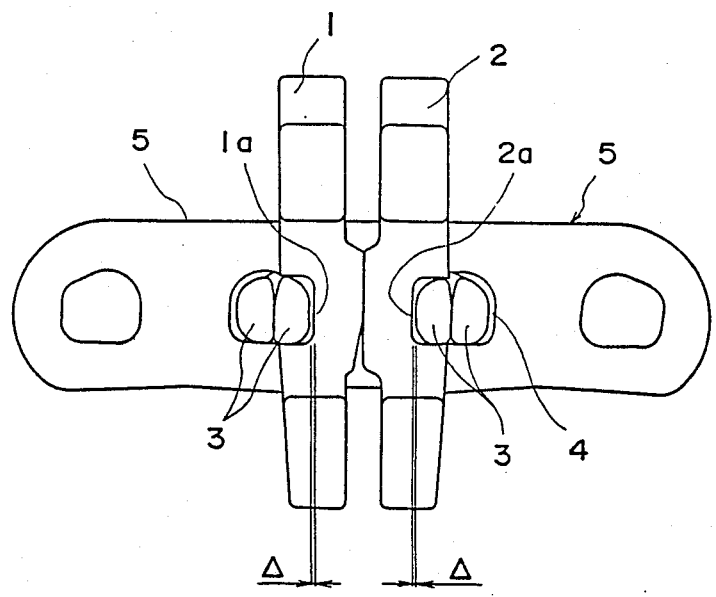
FIGS. 1 (a) and (b) are view showing the overall structure of parts of a conventional transmission belt.
Figure 1B:
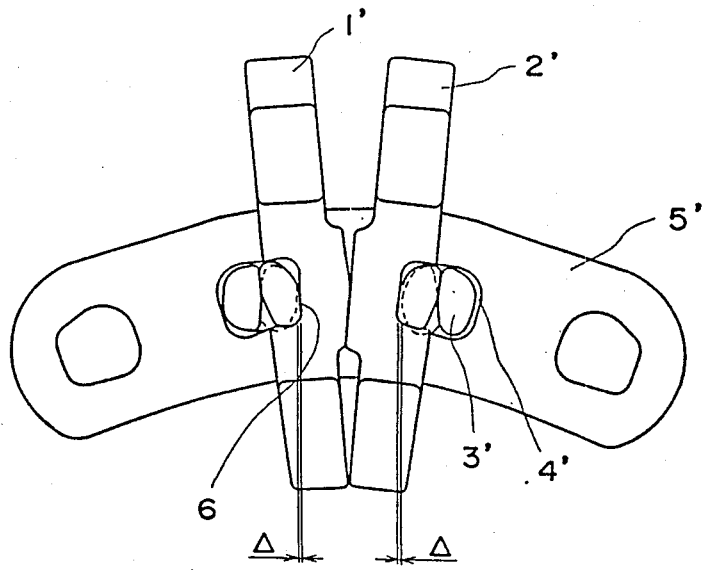
Figure 2:
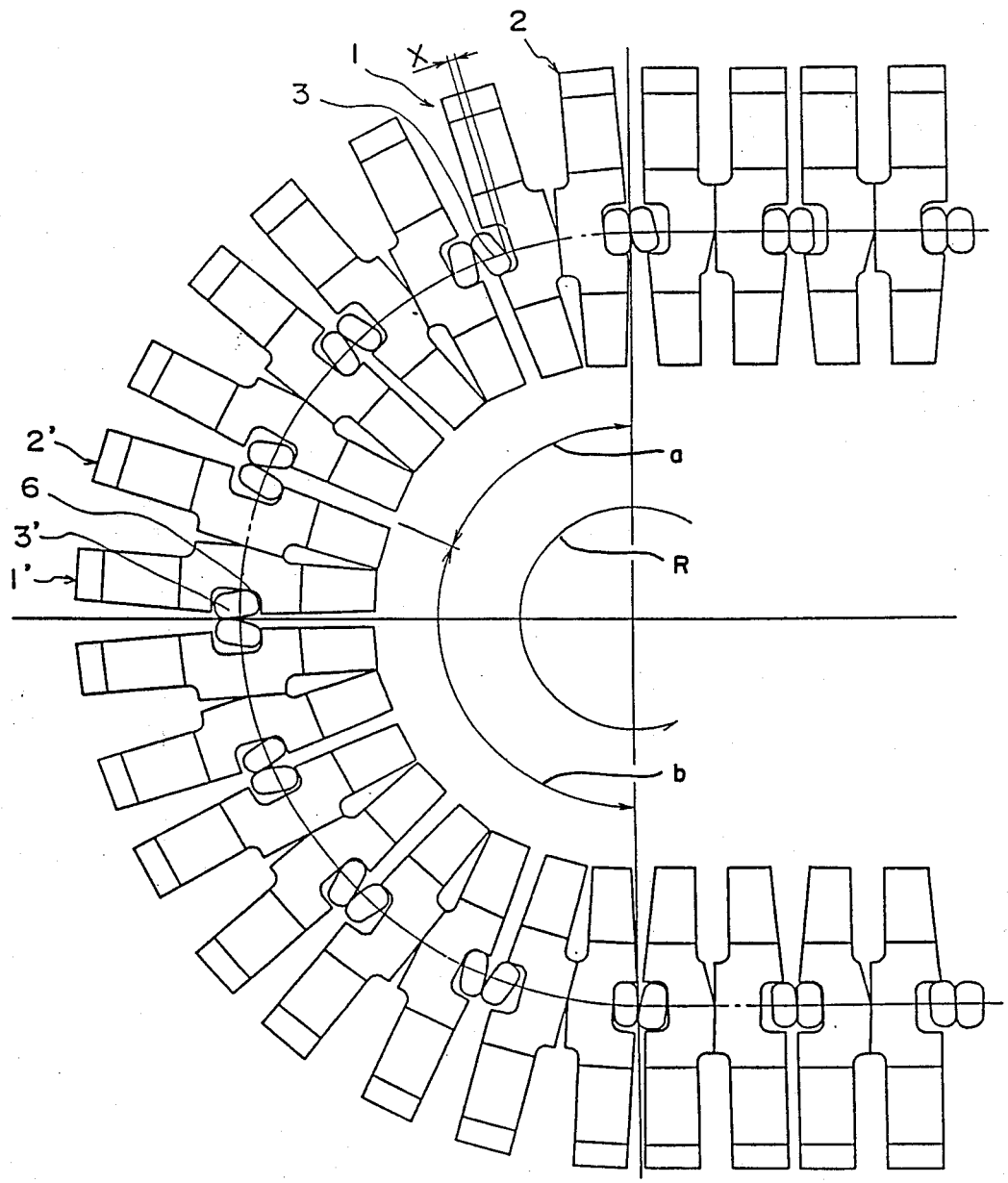
FIG. 2 is a side view showing the operational state of a conventional endless transmission belt.
Figure 3:
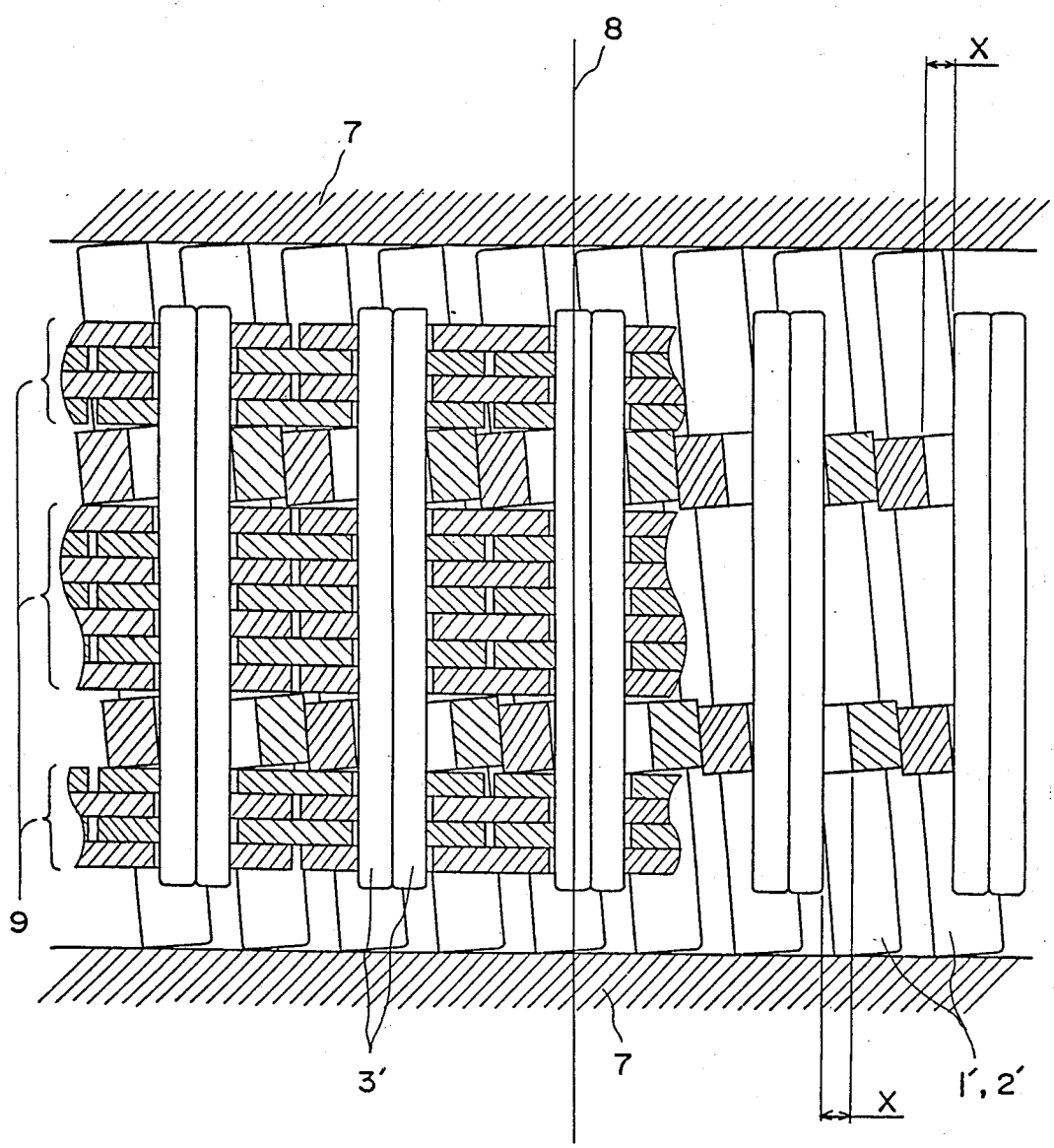
FIG. 3 is a sectional view showing the state of engagement of the conventional endless transmission belt with pulleys.

As shown in Fig.5, each first block member 31 has a generally trapezoidal configuration when viewed from the front, and includes an opening 36 in the center, notch portions 37a on either side of the opening 36, a head portion 31f, columns 31c, an upper span portion 31d, and a lower span portion 31e. Enlarged portions 31g are formed on the two ends of the upper span portion 31d, and enlarged portions 31h are formed on the two ends of the lower span portion 31e. The end faces 31i of the enlarged portions 31g and the end faces 31j of the enlarged portions 31h form surfaces of contact with pulleys (such as pulleys 7 shown in FIG. 3), and are positioned on contact planes 38 in such a manner as to come into smooth contact with the pulleys. Thus, each first block member 31 has a generally trapezoidal configuration in cross-section. The columns 31c of the first block members 31 have pin engagement grooves 39 (see FIG. 4) formed therein. Each groove 39 is formed at a middle portion of one of the front-side and back-side surfaces of the column 31c.

Each of the second block members 32 has the same configuration as the first block member 31. Each second block member 32 is paired with a first block member 31, with the pin engagement grooves 39 formed at the middle portions of the side surfaces of the columns of the block members 31 and 32 facing each other.

Each of the pins 33 is bar-shaped with a cocoon-shaped cross-section (see FIG. 4). The pins 33 are formed into pairs, each pair comprising two pins 33 received together in the mating pin engagement grooves 39 of the first and second block members 31 and 32, and engaged with the sets of link plates 34.

The link plates 34 are arranged in parallel as sets. Adjacent sets have their link plates alternately intermeshed. As shown in FIG. 5, seven link plates are disposed in the openings 36 and eight link plates in total are disposed in the notch portions 37a on either sides of the openings 36, that is, fifteen link plates in total are arranged in parallel over the width of the belt, thereby forming each link set.

Next, detailed descriptions will be given concerning the structure and operation of the blocks in accordance with the present invention. As described before, the first block members and the second block members have the same configuration, though their positions are different when the block members are assembled to constitute the belt. Therefore, those detailed descriptions will be given concerning the first block members 31 alone (which will hereafter be simply referred to as "blocks").

As described before, each block 31 has an engagement groove 39 at the middle portion of the side surface of the column 31c. Details of this structure are shown in FIGS. 6 and 7. Each pin engagement groove 39 comprises a first horizontal portion 31n continuing with a portion 31m of the side surface of the column 31c via a corner, a first corner portion 31o consisting of a rounded portion continuing with the horizontal portion 31n, a vertical portion 31p continuing with the corner portion 31o, a transitional portion 31q consisting of a rounded portion continuing with the vertical portion 31p, a tapering portion 31r continuing with the transitional portion 31q, a second corner portion 31s consisting of a rounded portion continuing with the tapering portion 31r, and a second horizontal portion 31t continuing with the second corner portion 31s, the second horizontal portion 31t also continuing with a lower portion 31u of the side surface via a corner.

Thus, according to the present invention, in contrast with the prior art, the bottom of each pin engagement groove 39 is formed with a recess (concavity) 40 having the tapering portion 31r continuing with the transitional portion 31q, and the recess 40 is arranged to compensate for the projection Δ of the pin 33.

The other side surface of each column 31c is formed with a transitional portion 31w continuing with an upper portion 31v of the side surface, a vertical portion 31x continuing with the transitional portion 31w, a tapering portion 31y continuing with the vertical portion 31x, and a second transitional portion 31z continuing with the tapering portion 31y.

Figure 8:
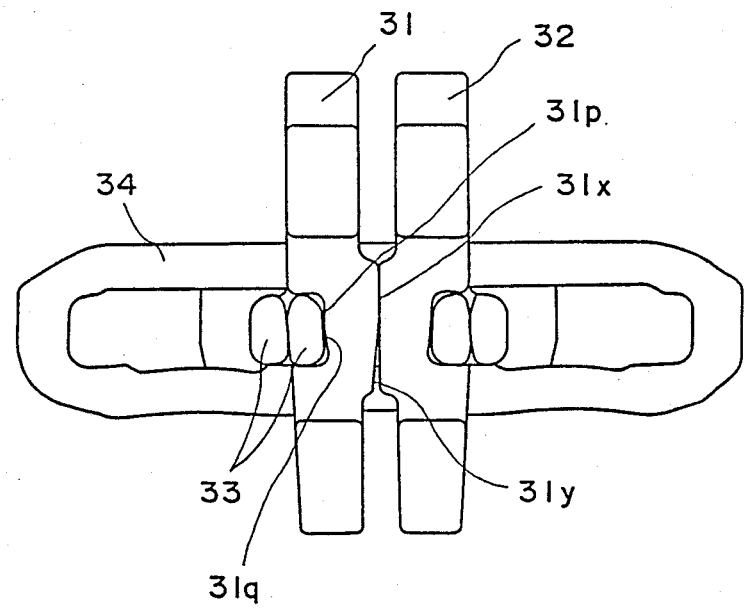
FIGS. 8 (a) and (b) are views showing the action of a part of the endless transmission belt in accordance with the embodiment of the present invention.
Figure 8:
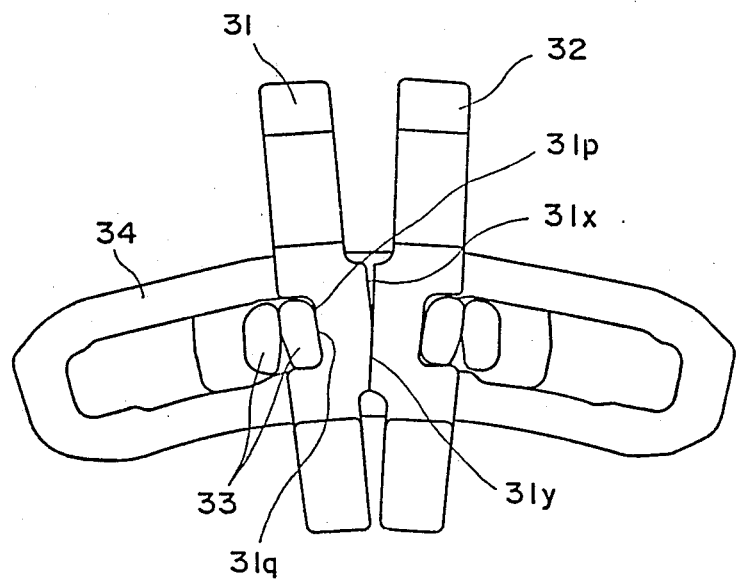

By virtue of the above-described structure, when the blocks 31 and the associated members are present in a straight portion of the belt, the pin 33 is brought into contact with the vertical portion 31p of the pin engagement groove 39 of the block 31, as shown in FIG. 8 (a). On the other hand, when these members are present in a bent portion of the belt, the projection Δ of the pin 33 is compensated for by the recess 40 of the pin engagement groove 39 of the block 31, with the pin 33 being brought into contact with the transitional portion (rounded portion) 31q of the groove 39. Reference numerals 34 in FIGS. 8 (a) and (b) denote link plates.

Therefore, it is no longer necessary to provide gaps (2×Δ), such as those provided in the prior art to cope with the projection Δ of the pins 33, between the pins 33 and the blocks 31 in a straight portion of the belt by reducing the thickness of the portion of the blocks that defines the pin engagement grooves 39. Consequently, even with the maximum possible thickness for the block 31 and its portion defining the pin engagement groove 39, the belt can be smoothly bent. (see FIG. 8 (b)).

When the blocks 31 and 32 are present in a straight portion of the belt, their vertical portions 31x contact each other, as shown in FIG. 8 (a). On the other hand, when these are present in a bent portion of the belt, they are slightly inclined and are in back-to-back engagement with each other, with their tapering portions 31y contacting each other, as shown in FIG. 8 (b).

A second embodiment of the present invention will now be described with reference to FIGS. 9 and 10.

As shown in these figures, an endless transmission belt 50 has blocks 51 each comprising a single block member, pins 61, and link plates 71 linking these members.

The overall structure of the above-mentioned components will be described.

Figure 10:
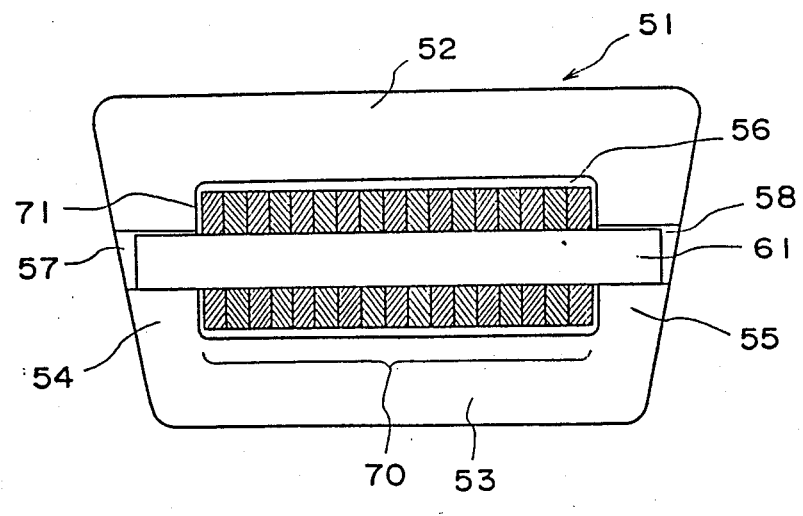
FIG. 10 is a view of a section through the endless transmission belt shown in FIG. 9.

As shown in FIG. 10, each block 51 is generally trapezoidal when viewed in cross-section, and has an upper span portion 52, a lower span portion 53, and columns 54 and 55 on either side of the span portions 52 and 53. The central portion of the block 51 is formed with a single opening 56, and the columns 54 and 55 are formed with grooves 57 and 58 having a similar configuration to that in the above-described first embodiment and engaging the end portions of the pins 61. The grooves 57 and 58 are formed in the front-side and back-side surfaces of each block 51, and with a configuration symmetrical with respect to the center line 59 of the block 51.

Figure 9:
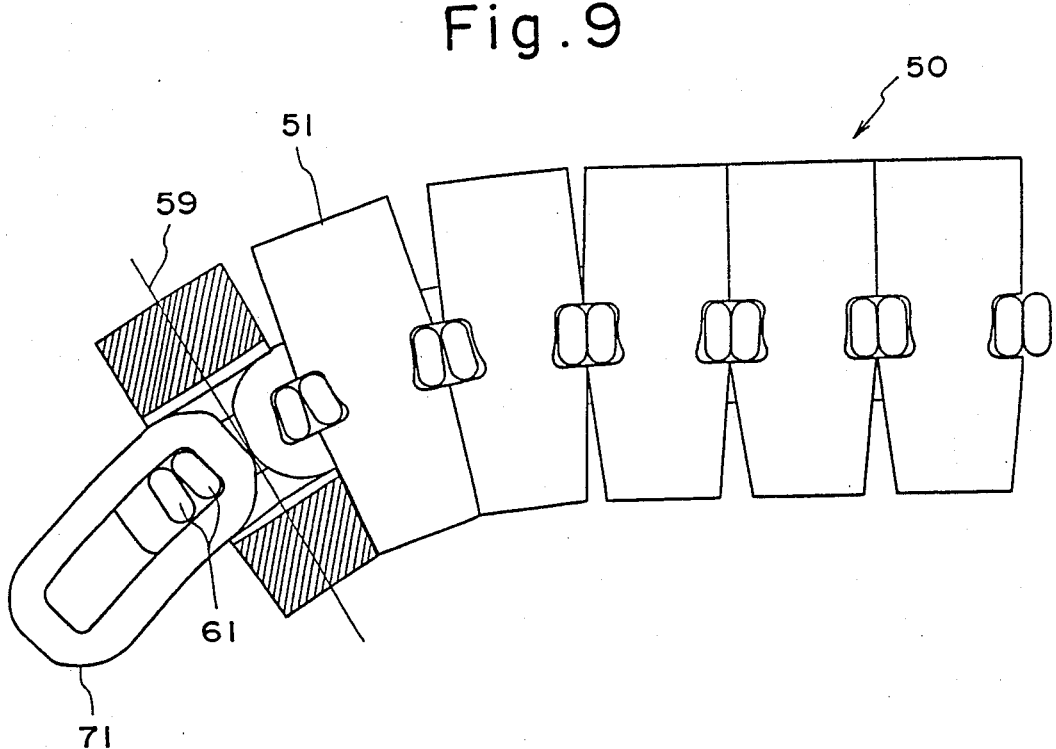
FIG. 9 is a partially cutaway side view of an endless transmission belt, showing a second embodiment of the present invention.

Each of the pins 61 is bar-shaped with a cocoon-shaped cross-section (see FIG. 9). The pins 61 are formed into pairs, each pair comprising two pins 61 received together in the pin engagement grooves 57 and 58 of each block 51, and engaged with the sets 70 of link plates 71.

The link plates 71 are arranged in parallel to form sets 70. Adjacent sets have their link plates 71 alternately intermeshed. As shown in Fig. 10, in compliance with the single opening 56, seventeen link plates 71 are arranged in parallel across the width of the belt, thereby forming each set 70 of link plates 71.

With the above-described structure, it is possible to achieve an endless transmission belt of simple construction that is capable of operating smoothly.

The present invention is not limited to the abovedescribed embodiments; other various modifications based on the spirit of the present invention are possible and they are not excluded from the scope of the present invention.

What we claim is:

1. An endless transmission belt comprising:
   a plurality of sets of link plates;
   a plurality of pin pairs, each pair of pins linking one end of one set of link plates to an adjacent end of another set of link plates to form the endless belt; said pins being oblong in cross-section, said pins of each pair canting by rotation against each other, about their longitudinal axes during passage around a pulley;
   a plurality of blocks mounted on and extending around the circumference of the belt, each of said blocks having a pair of generally parallel surfaces transverse to said belt, at least one of said generally parallel surfaces having a pin engagement groove, said groove entrapping a pin pair in cooperation with a mating pin engagement groove of an adjacent block and said groove having a recess for accommodating the canting of said pins during travel around a pulley.

2. The endless transmission belt of claim 1 wherein said pin engagement groove is defined by an opening, a bottom surface opposite said opening and a pair of side walls running from said bottom surface to said opening, said bottom surface having a first section parallel to the major axis of a transverse crosssection through the block and a second section sloping from said first section and forming said recess.

3. The endless transmission belt of claim 2 wherein said bottom surface is further defined by a transitional section connecting said first and second sections and wherein said side walls are joined to said bottom surface through rounded surface portions.

4. The endless transmission belt of claim 2 wherein each of said blocks has at least one central aperture extending between said generally parallel surfaces, at least a portion of said plurality of said link plates extending through said one aperture.

5. The endless transmission belt of claim 1 wherein said blocks are paired, with their pin engagement grooves in a facing relationship and one of said pin pairs entrapped between said facing pin engagement grooves, and wherein each block is asymmetrical with respect to the major axis of its transverse cross-section, with the other of said parallel surfaces having a rocking surface portion in contact with a block of an adjacent pair of blocks.

6. The endless transmission belt of claim 1 wherein each of said blocks is symetrical with respect to its major axis in transverse cross-section and each of its surfaces contacting adjacent blocks is configured to allow for the rocking of adjacent blocks against each other in passage around a pulley.

7. The endless transmission belt of claim 1 wherein each of said blocks has at least one central aperture extending between said generally parallel surfaces, at least a portion of said plurality of said link plates extending through said one aperture.

8. The endless transmission belt of claim 1 wherein each of said plurality of blocks has a pin engagement groove in both of its generally parallel surfaces.

* * * * *

UNITED STATES PATENT AND TRADEMARK OFFICE
CERTIFICATE OF CORRECTION

PATENT NO. : 4,919,645

DATED : April 24, 1990

INVENTOR(S) : SAKAKIBARA et al

It is certified that error appears in the above-identified patent and that said Letters Patent is hereby corrected as shown below:

<u>IN THE ABSTRACT</u>:

Line 4, after "arranged" insert a comma --,--.

Col. 1, line 28, "can't" should read --cant--; and
   line 44, "blacks" should read --blocks--.

Col. 4, line 60, "when" should read --When--.

Col. 5, line 35, "abovede-" should read --above-de- --.

<u>IN THE CLAIMS</u>:

Col. 6, line 14, "crosssection" should read --cross-section--.

Signed and Sealed this

Twenty-seventh Day of August, 1991

Attest:

HARRY F. MANBECK, JR.

*Attesting Officer*      *Commissioner of Patents and Trademarks*